E. RITZ, Jr.
ELECTRIC PORTABLE GRINDER.
APPLICATION FILED MAY 14, 1917.
1,241,659. Patented Oct. 2, 1917.
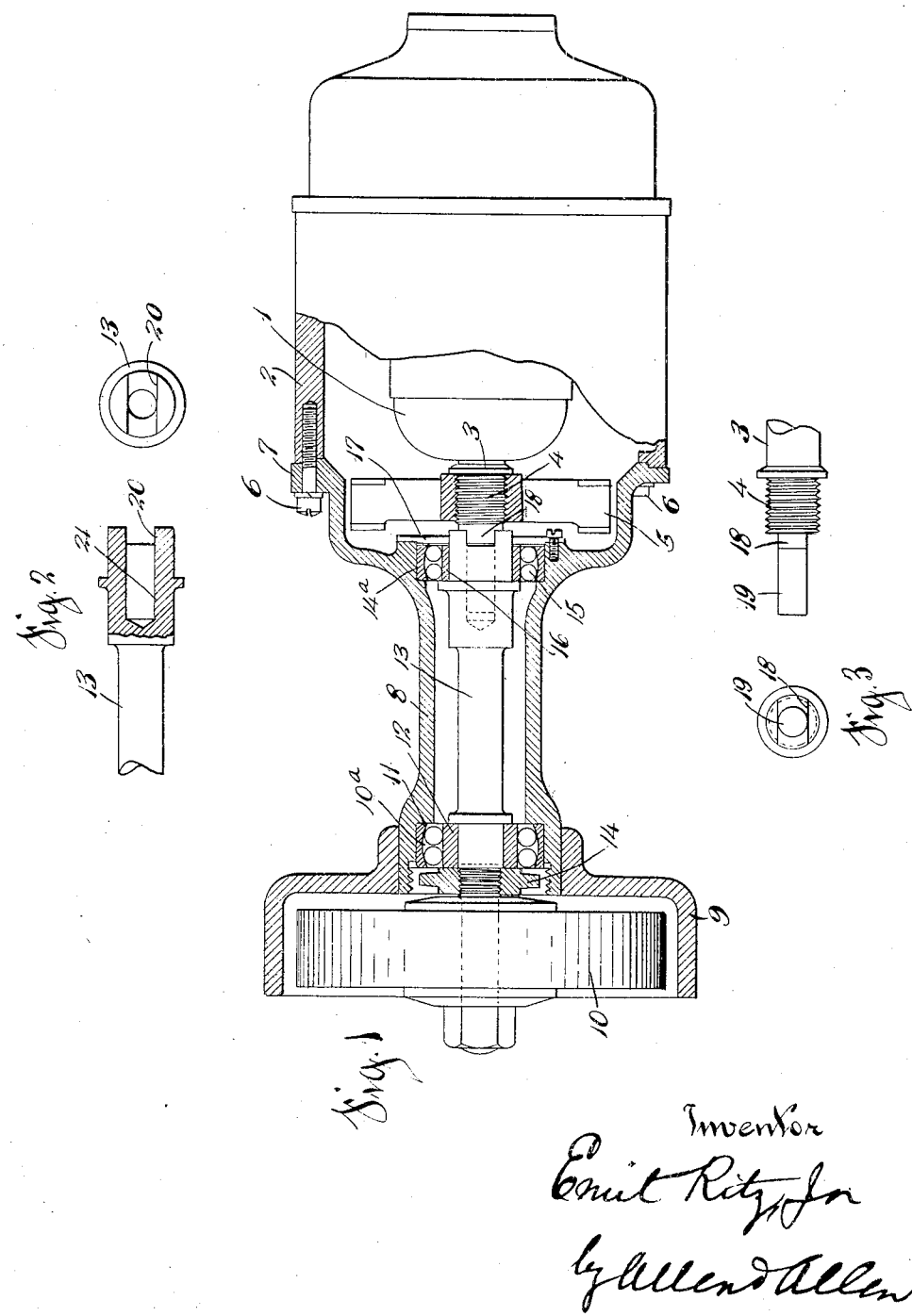
Inventor
Emil Ritz, Jr.
by Allen & Allen
Attorneys

UNITED STATES PATENT OFFICE.

EMIL RITZ, JR., OF CINCINNATI, OHIO, ASSIGNOR TO THE HISEY-WOLF MACHINE COMPANY, OF CINCINNATI, OHIO, A CORPORATION OF OHIO.

ELECTRIC PORTABLE GRINDER.

1,241,659.  Specification of Letters Patent.  Patented Oct. 2, 1917.

Application filed May 14, 1917. Serial No. 168,520.

*To all whom it may concern:*

Be it known that I, EMIL RITZ, Jr., a citizen of the United States, and a resident of the city of Cincinnati, in the county of Hamilton and State of Ohio, have invented certain new and useful Improvements in Electric Portable Grinders, of which the following is a full, clear, and exact description, reference being had to the accompanying drawings, forming part of this specification.

This invention relates to portable grinders, driven by electric motors which are portable with the grinder. In devices of this character it is extremely desirable that various lengths of the grinder shafts can be used, and for this purpose that the grinder shafts be mounted on and connected to the motor so that they can be removed and ones of different length be applied.

The difficulty in accomplising this purpose is that, hitherto so far as I am informed, there has been no device which is fully effective in preventing quivering of the grinder shaft, when it has any length at all, and hence the chattering of the grinder wheel itself.

It is essential of this invention to provide a means of connecting and supporting the extension grinder shafts in a portable motor driven grinder such that they will be firm with the rotor shafts of the motor used. There is also provided in this invention a simple and easily detachable casing for the grinder shafts, making up an extension unit, as it is called, and a bearing construction which greatly adds to the essential point of the invention above noted.

The above objects and other advantages to be noted are accomplished by that certain construction and arrangement of parts to be hereinafter more specifically pointed out and claimed.

In the drawings,

Figure 1 is a central longitudinal section of the device with the motor element partly in elevation.

Fig. 2 is a detail longitudinal section of the end of the grinder shafts with an end elevation projected therefrom.

Fig. 3 is a side elevation of the end of the rotor shaft with an end elevation projected therefrom.

The device comprises a motor having a rotor 1, and a casing 2. The rotor shaft 3 has a threaded portion 4 for the usual cooling fan 5, and the casing is tapped with holes for the bolts 6, 6, that secure the extension unit casings to the motor casing. The extension unit casings have the flanged ends 7 which are all of the correct size to fit the end of the motor casing and are bolted removably thereto by means of the bolts above mentioned. The casings have also the cylindrical sleeve portions 8 which will vary in length as determined by the length of the grinder shaft which it is desired to retain, and at the end of these casings there may be mounted a protecting housing 9 for covering part of the grinder wheel 10.

At the outer end of the casings there is housed the outer ring $10^a$ for the ball bearing 11; the bearing has an inner ring 12, which rests around the grinder shaft 13, and the nut 14 holds the bearing in place. At the inner end of the casing is the outer ring $14^a$ for the ball bearing 15, there being also an inner ring 16 for the bearing which engages around the shaft 13. The cover plate 17 holds the bearing rings in place at this end of the casing.

Now as will be described, the rotor shaft passes through the bearing $14^a$, 15, 16, as well as the inner end of the grinder shaft, and thus it can be seen that the extension unit housing carries both bearings for the grinder shaft, thereby making its motion under control of two bearings carried by the same member.

The end of the rotor shaft is squared at 18 and rounded at 19, forming a square portion terminating in a relatively long rounded portion. The ends of the grinder shafts are formed for each unit, with a squared cut 20 to snugly fit the square of the rotor shaft and with a rounded socket 21 to receive the rounded end of the rotor shaft.

It is very important that the common bearing should engage over the grinder shaft just behind the squared socket in the end thereof, or at least behind or at the very end of the said shaft, and that the rounded end of the rotor shaft should lie inside of the grinder shaft where it is held by the bearing, because this gives to the two shafts not only a long socketed connection which alines them as perfectly as possible, but it also gives a bearing for the outer end of the rotor shaft, as well as the inner end of the grinder shaft, thus providing a common bearing for both the grinder and rotor shafts at the point of union. The socket arrangement might readily be reversed, as is apparent.

This arrangement of the bearings in connection with the socketed connection is very valuable, although it is believed that the invention includes within its spirit the providing of a common bearing for rotor and grinder shafts in such a tool, even should some other sort of connection be provided.

So also with the socketed connection, this would be of value without the arrangement of the socketed parts with reference to a common bearing member.

The assembly of parts now described provides for a portable grinder, in which various lengths of grinder shafts may be easily and safely used. The extension casings are mounted fast on the motor casings, and the grinder shafts find both of their bearings in the extension casings. There should be provided with each motor a series of casings and shafts, i. e. extension units, which would give to the operator all of the lengths that he needed. The arrangement of the bearing gives a firm, frictionless bearing for the end of the rotor shaft and does away, together with the socketed connection, with all tendency to chatter in the grinder wheel.

Having thus described my invention, what I claim as new and desire to secure by Letters Patent is:—

1. In a portable electric grinder, the combination of a motor and a casing therefor, an extension grinder-shaft and a casing therefor, bearings at both ends of the grinder shaft in said latter casing, the rotor shaft of the motor, and means for coupling together the grinder and rotor shafts, whereby the rotor shaft passes through the inner bearing for the grinder shaft, for the purpose described.

2. In a portable electric grinder, the combination of a motor and a casing therefor, a rotor therein having a shaft, a removable extension casing mounted on the motor casing, a grinder shaft supported in the removable casing, means for coupling together the rotor and grinder shafts comprising a squared opening in the end of the grinder shaft terminating in an elongated socket, and a projection on the end of the rotor shaft adapted to fit into the grinder shaft, said projection terminating in a squared portion adapted to fit the squared opening in the end of the grinder shaft.

3. In a portable electric grinder, the combination of a motor and a casing therefor, a rotor therein having a shaft, a removable extension casing mounted on the motor casing, a grinder shaft supported in the removable casing, means for coupling together the rotor and grinder shafts comprising a squared opening in the end of the grinder shaft terminating in an elongated socket, and a projection on the end of the rotor shaft adapted to fit into the grinder shaft, said projection terminating in a squared portion adapted to fit the squared opening in the end of the grinder shaft, a bearing at the inner end of the removable casing through which the inner end of the grinder shaft extends, said socket in said shaft positioned so that it lies within the said bearing.

4. In a machine of the kind specified, a portable motor, a casing therefor, a shaft for the motor, an extension unit for grinding, a casing therefor, means for connecting without vibration the two shafts, comprising connecting means between the casings of the motor and the unit, and a common bearing for the two shafts located in the extension unit casing, the end of the motor shaft being supported within said bearing.

EMIL RITZ, Jr.